April 7, 1970   J. F. PTACEK ET AL   3,504,778
MULTIPLE PRICE COIN CHANGER FOR VARIABLE PRICE VENDING MACHINES
Filed Dec. 20 1967

INVENTORS.
James F. Ptacek
Robert E. Patterson

BY Schmidt, Johnson, Hovey,
Williams & Bradley.
ATTORNEYS.

United States Patent Office 3,504,778
Patented Apr. 7, 1970

3,504,778
MULTIPLE PRICE COIN CHANGER FOR
VARIABLE PRICE VENDING MACHINES
James F. Ptacek, Kansas City, and Robert E. Patterson, Raytown, Mo., assignors to The Vendo Company, Kansas City, Mo., a corporation of Missouri
Filed Dec. 20, 1967, Ser. No. 692,222
Int. Cl. G01f 11/00
U.S. Cl. 194—10
16 Claims

ABSTRACT OF THE DISCLOSURE

A multiple price vending machine employs credit registering and change determining apparatus having a plurality of price terminals, a number of over-price connections, and a totalizer element which establishes electrical continuity between the over-price connections and the price terminals corresponding to the amounts of over-deposit for each price for which change will be returned to the customer. Vend solenoids or the like for the articles to be dispensed are connected in series with appropriate price terminals, and a payout module is employed having gating transformers therein connected in series with corresponding over-price connections. Each of the gating transformers controls the operation of a silicon controlled rectifier, the various rectifiers in turn controlling the energization of change payout solenoids. When the deposit is in excess of the price of the selected article, a series circuit is established through the vend solenoid, the totalizer element, the appropriate over-price connection, and the gating transformer or transformers which cause the payout of proper change. Since only a very small percentage of the total voltage drop across the series circuit is required to operate the change determining portion of the same, it is possible to apply the changer to different types of existing vending machines with a minimum modification of their circuitry.

---

Figure 1:
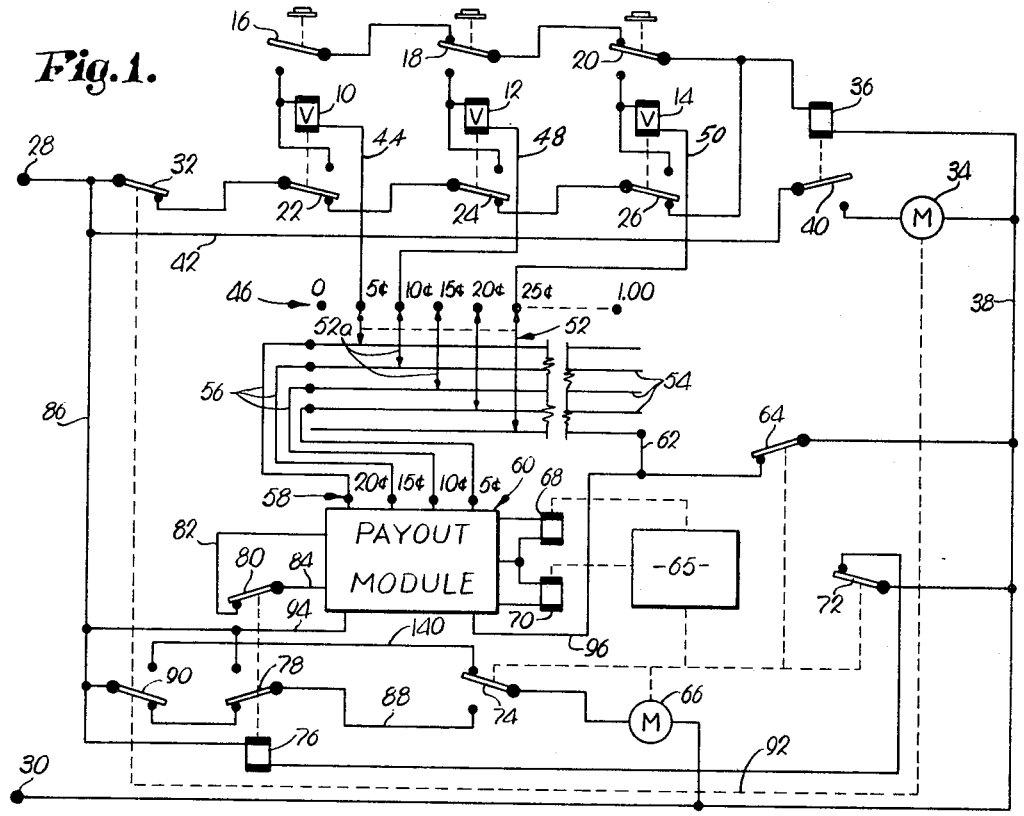

The development of the multiple price vending machine places demands on the coin changing apparatus of the machine which are not encountered in the earlier vending machines of the single price type. For true flexibility, the changer apparatus must be capable of responding to a change payout signal from the deposit totalizer and delivering proper change in accordance with the over-deposit information represented by the payout signal.

Multiple price vending machines are quite desirable from a commercial standpoint because of the selection of products which may be accommodated. Therefore, cost competition in the design of machines of this type is quite keen, and is reflected in the changer apparatus where oftentimes relatively complex electromechanical arrangements are employed to provide the requisite flexibility in change payout.

With increasing complexity of the total vending system, it naturally becomes more difficult to hold the price at a competitive level due to the large number of components required. Therefore, it may be readily appreciated that minimization of components is essential both from the standpoints of cost advantage and serviceability.

Furthermore, it is desirable to provide as compact a machine structure as possible in order to adapt the vending machine for use in a multitude of physical surroundings. Many mechanical payout control systems, as well as electromechanical arrangements utilizing relays and other bulky hardware, are inherently cumbersome and space consuming.

It is, therefore, an important object of the instant invention to provide apparatus for controlling the payout of change from vending machines wherein such apparatus is not subject to many of the problems and disadvantages discussed above.

More specifically, it is an important aim of this invention to provide change payout initiating circuitry having the advantages of compactness, low service requirements, and simplicity of installation and which, furthermore, may be utilized with a variety of coin changer structures having different mechanical arrangements for discharging change to the customer.

A further and important object of the invention is to provide circuitry as aforesaid in the form of a compact module having over-price terminals serving as inputs to the module to which the deposit totalizer is connected, and having an output in the form of electrical leads to coin payout solenoids or other electrically responsive coin payout structure, whereby the advantages of compactness, simplicity of installation, and versatility mentioned above are realized.

Additionally, it is an important object of this invention to provide a change payout system for a vending machine in which change determination is accomplished instantaneously upon selection of a product by a customer in order to minimize the number of components required and to obviate the necessity to hold price information during the vend cycle while a delayed change determination is being made.

As a corollary to the last-mentioned object, it is an important aim of this invention to provide a series sensing arrangement in which the sensing of the selection of an article and the determination of the sufficiency of the deposit are accomplished in a series circuit with means which commands the payout of proper change, to the end that the amount of change is determined and the changer is conditioned for payout at the same instant that the selection is made and the vend is initiated.

Figure 3:
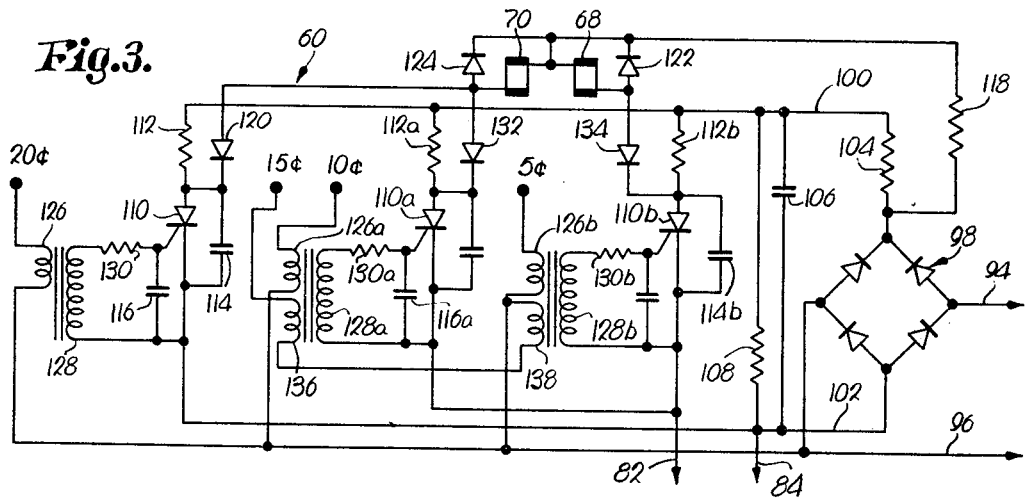
Figure 2:
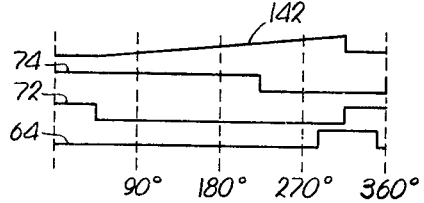

In the drawing:
FIGURE 1 is an electrical schematic diagram of a simplified, exemplary electrical control arrangement for a multiple price vending machine;
FIG. 2 is a timing graph illustrating the operation of the control arrangement of FIG. 1; and
FIG. 3 is an electrical schematic diagram of the payout module of the instant invention.

Referring to FIG. 1, three vend solenoids 10, 12 and 14 of a multiple price vending machine are illustrated to represent three articles of different prices which the machine is capable of vending. Push button operated selector switches 16, 18 and 20 are associated with respective vend solenoids 10, 12 and 14 and are connected in series with holding switches 22, 24 and 26 mechanically coupled with solenoids 10, 12 and 14 respectively. Alternating current line voltage is available at power terminals 28 and 30, the terminal 28 being connected in series with the holding switch 22 through a normally closed, carry-over switch 32 for the vend motor 34. Thus, a series circuit is established from power terminal 28 through the normally closed contacts of carry-over switch 32, the holding switches 22, 24 and 26, and the selector switches 20, 18 and 16 in that order. The coil 36 of a vend motor relay is connected to the series power circuit between the switches 26 and 20 and is returned to power terminal 30 by a lead 38. A relay switch 40 is held open by normally energized relay coil 36 and connects the vend motor 34 across power terminals 28 and 30 via lead 42 and the lead 38 when the vend relay is de-energized.

The dispensing mechanism (not shown) with which the vend solenoids 10, 12 and 14 and vend motor 34 are associated may be of a general type as disclosed in Craven et al., U.S. Letters Patent No. 3,231,129, entitled "Staggered Stack Vending Machine," and granted Jan. 25, 1966. The vend solenoid 10 is associated with a column of articles priced at 5¢; note in this respect that a lead 44 extends from solenoid 10 to a terminal labeled 5¢, such terminal being one of a series of price terminals 46 representing prices from 5¢ to $1.00 in 5¢ increments. The 30¢ through 95¢ terminals are not shown. Similarly, a lead 48 connects vend solenoid 12 with the 10¢ price terminal, and a lead 50 connects vend solenoid 14 with the 25¢ price terminal.

The series of price terminals 46 form a part of suitable electromechanical credit registering and change determining apparatus having a totalizer element 52 which is illustrated diagrammatically. The totalizer element 52 has five wipers 52a and is shown in the position thereof corresponding to a deposit of 25¢. Note in this respect that the lead wiper 52a (on the right) is bridging the 25¢ price terminal and one of five spaced contact tracks 54; each of the other wipers 52a is bridging a lesser valued price terminal and another of the tracks 54.

Normally, before the deposit of money in the machine, the lead wiper 52a engages the "0" price terminal and the bottom track 54, totalizer element 52 shifting one step to the right in FIG. 1 in response to each nickel increment of the deposited coinage. It should be understood that totalizer element 52 is illustrated entirely diagrammatically. The actual structural configuration thereof may take a variety of forms, including a gravity biased rotor which is normaly held in standby by a coin-responsive escapement mechanism. Deposited coins traveling through the coin tracks of the coin acceptor engage coin feelers projecting into the tracks from the escapement mechanism, the weight of the falling coins against the feelers operating the mechanism to permit the rotor to displace by gravity a distance proportional to the value of the deposited coins.

Four leads 56 extend from the left ends of the first four tracks 54 and form over-price connections which interconnect the tracks with four over-price terminals 58 of a payout module 60. The over-price terminals 58 are designated 20¢, 15¢, 10¢ and 5¢, and each corresponds in value to the over-deposit condition represented by the particular track 54 to which it is connected. The last or lowermost track 54 is not connected to the over-price terminals 58; instead, a correct price lead 62 extends from this track 54 to a normally closed reset switch 64 connected to lead 38.

A change payout mechanism 65 is illustrated in block diagram form and is operated by a changer motor 66 and nickel and dime payout solenoids 68 and 70. The mechanism 65 employs two change storage tubes, one containing nickels and the other containing dimes. A coin slide is disposed beneath each tube and, upon reciprocation thereof, transfers a coin from beneath the tube to a position where it gravitates from the slide into a discharge chute for conveyance to the customer. Each of the slides is normally held against movement to its coin discharging position by the inoperative changer motor 66. Furthermore, a latch operated by the corresponding solenoid 68 or 70 is associated with each of the slides respectively and prevents coin discharging movement thereof when changer motor 66 is rendered operative (which will be the case even though no change is to be paid out) unless the solenoid is energized to release the latch. Upon release of the latch of one of the slides, the latter moves under spring bias to its discharge position when the changer motor 66 is rendered operative and is subsequently returned to standby as the changer motor shaft continues to rotate. A change payout mechanism of this type is shown and described in a copending application for U.S. Letters Patent of Offutt et al., entitled "Multi-Price Coin Changer Having a Dual Denomination Payout," Ser. No. 611,047, filed Jan. 23, 1967, and now Patent No. 3,406,803, and owned by the assignee herein, such application being incorporated herein by reference as may be necessary for a full and complete understanding of the structure and operation of mechanism 65.

The two coin payout solenoids 68 and 70 for operating the latches of the two coin slides of mechanism 65 are electrically connected to the output of the payout module 60. Although in the embodiment of the invention illustrated herein the change coins comprise nickels and dimes, it should be understood that other and/or additional denominations could be employed as change coins in accordance with the logic of the instant invention to be discussed hereinafter, depending upon the requirements of a particular vending system.

The changer motor 66 controls the operation of the normally closed reset switch 64, a normally closed hold switch 72, and a single-pole, double-throw motor carryover switch 74. The three switches 64, 72 and 74 are cam operated from the shaft of motor 66 and are timed as illustrated in FIG. 2, such timing to be discussed more fully hereinafter.

A hold relay has a coil 76 which operates a pair of relay switches 78 and 80 shown in their normal standby positions with coil 76 energized. Thus, with power connected to the terminals 28 and 30, switch 80 is closed to interconnect a pair of reset leads 82 and 84 extending from the payout module 60, and switch 78 connects a power lead 86 (extending from power terminal 28) with the normally open contact of the carry-over switch 74 via a lead 88.

A single-pole, double-throw start switch 90 for commencing operation of changer motor 66 is controlled by the vend motor 34 as illustrated by the mechanical linkage 92 interconnecting vend motor 34, start switch 90 and the carry-over switch 32. The switches 32 and 90 may be cam operated from the shaft of vend motor 34 and are shifted from their standby positions illustrated after the vend is committed, which would normally be after approximately 90° of shaft rotation.

The payout module 60 is shown in detail in FIG. 3. Power is supplied to the module by leads 94 and 96 which may also be seen in FIG. 1, lead 94 being connected to lead 86 and lead 96 being connected through reset switch 64 to lead 38. The leads 94 and 96 are connected within module 60 to the input of a bridge rectifier 98, a pair of leads 100 and 102 being connected with the output thereof for supplying direct current to the module circuitry. Filtering of the DC output is effected by a series resistor 104 and a parallel connected condenser 106, and a bleeder resistor 108 is connected across the output leads 100 and 102.

Three bistate switching devices in the form of silicon controlled rectifiers 110, 110a and 110b control the energization of the nickel and dime payout solenoids 68 and 70. The SCR 110 presents switching terminals at its cathode and anode, the anode thereof being connected to lead 100 through a resistor 112 and the cathode thereof being directly connected to lead 102. For purposes of transient reduction, a capacitor 114 is connected in parallel with the cathode-anode circuit of SCR 110, and a second capacitor 116 is connected across the input or gate of SCR 110 and the cathode thereof. The solenoids 68 and 70 have a common connection with the positive output of bridge rectifier 98 through a resistor 118, the opposite side of dime solenoid 70 being connected by a diode 120 to the anode of SCR 110. A pair of diodes 122 and 124 are parallel connected with solenoids 68 and 70 respectively for purposes of transient suppression.

The primary winding 126 of a gating transformer is connected in series between the 20¢ over-price terminal and lead 96, the latter being directly connected to the AC power terminal 30 when reset switch 64 is closed. The gating transformer has a secondary winding 128, one end thereof being connected to the gate of SCR 110 through a current limiting resistor 130. The opposite end of secondary winding 128 is returned to the DC power lead 102.

The components associated with SCR's 110a and 110b are similarly arranged and are designated by the same reference characters as utilized hereinabove with the addition of the "a" or "b" notation. The anode of SCR 110a is connected to the dime payout solenoid 70 through a diode 132, while the anode of SCR 110b is connected to the nickel payout solenoid 68 through a diode 134.

One important difference in the operation of SCR's 110a and 110b lies in the use of a double primary for the gating transformers therefor. Referring to SCR 110a, the primary 126a of its gating transformer is connected in series between the 10¢ over-price terminal and lead 96. A second primary winding 136 is connected in series between the 15¢ over-price terminal and one end of a second primary winding 138 associated with the first primary winding 126b of the gating transformer for SCR 110b. Primaries 126b and 138 have a common connection with lead 96; thus, primary 126b is serially connected between the 5¢ over-price terminal and lead 96, while the two additional primaries 136 and 138 are connected in series between the 15¢ over-price terminal and lead 96.

Operation

It should be understood at the outset that the circuitry of FIG. 1 is exemplary only and is simplified for the purpose of illustrating the instant invention. For example, the provision of an escrow and the associated components necessary to effect coin return or coin acceptance are not shown. Additionally, the coin return electromagnets commonly utilized in vending machines to prevent additional deposits during a vend cycle are omitted from the circuitry.

Assuming that the customer desires to purchase an article in the column under the control of vending solenoid 12, it may be noted that the price of the article is 10¢ since lead 48 from solenoid 12 is connected to the 10¢ price terminal. The position of totalizer element 52 represents a deposit of 25¢ which, of course, is more than adequate for the purchase of the article but represents a 15¢ over-price condition requiring the payout of appropriate change.

After the deposit is made, the customer operates selector switch 18 to, in turn, energize vend solenoid 12 by the following circuit: From AC power terminal 28 through the holding switches 22, 24 and 26, through the unoperated selector switch 20 to the movable pole of selector switch 18 now engaging its lower contact, through solenoid 12 and along lead 48 to the 10¢ price terminal, along the wiper 52a in contact with the 10¢ price terminal to the second wiper track 54, then to the 15¢ over-price terminal via the corresponding over-price connection 56, through the primary winding 136 and the primary winding 138 of the gating transformers for SCR's 110a and 110b, and finally, along lead 96 to the AC power terminal 30 through the closed reset switch 64. It should be understood that all of the SCR's, prior to this time, are in their nonconductive states by virtue of a reset function of the circuitry to be subsequently described; therefore, SCR's 110a and 110b are placed in conduction by the action of their gating transformers to energize both of the payout solenoids 68 and 70.

Before proceeding with the operation, it should be understood that, in standby with power applied, the coil 36 of the vend motor relay is energized to maintain switch 40 open. Additionally, the coil 76 of the hold relay is also energized in standby to close switch 80 and move the pole of switch 78 into engagement with its lower contact. Therefore, at the time that any of the selector switches 16, 18 or 20 are operated, relay coil 36 is de-energized due to the actuation of one of the holding switches 22, 24 or 26. In the instant example, the movable pole of holding switch 24 is shifted into engagement with its upper contact to break the power circuit to relay coil 36 and establish a holding circuit through vend solenoid 12. This closes switch 40 to energize the vend motor 34 and commence the vending cycle.

The energization of the nickel and dime payout solenoids 68 and 70 by the module 60 conditions the changer to pay out change, but actual payout is delayed until such time as changer motor 66 commences operation. As discussed hereinabove, the coin payout mechanism 65 employs spring-biased coin slides that are normally held against movement under their springs by a suitable linkage with the changer motor. Thus, the shaft of the changer motor must revolve through a predetermined angular displacement before the coins are discharged from the slides. In the exemplary circuitry of FIG. 1, energization of changer motor 66 is delayed until the vend is committed, whereupon cam switches 32 and 90 are actuated by vend motor 34. This breaks the holding circuit to vend solenoid 12, but vend motor 34 continues in operation since relay coil 36 remains de-energized and its associated switch 40 remains closed. Actuation of start switch 90 connects the changer motor 66 across the AC power terminals 28 and 30 by a circuit extending along lead 86, through the actuated start switch 90, along a lead 140 to switch 74, and thence through changer motor 66 to power terminal 30.

The interruption of the series circuit through primary windings 136 and 138 at the time that changer motor 66 is energized, of course, does not result in the de-energization of the payout solenoids 68 and 70 since SCR's 110a and 110b remain in their conductive states once they are gated. As motor 66 commences operation, the nickel and dime coin slides discharge 15¢ in change in the form of one nickel and one dime.

Referring to FIG. 2, where the timing for the cam-operated reset switch 64, hold switch 72, and changer motor carry-over switch 74 is illustrated and referenced by numerals corresponding to the reference numerals designating such switches in FIG. 1, it may be seen that hold switch 72 opens after 45° of rotation of the shaft of changer motor 66. This de-energizes the coil 76 of the hold relay to open switch 80 and connect the movable pole of switch 78 directly to lead 94.

It should be noted that, unlike the cathode of SCR 110, the cathodes of SCR's 110a and 110b are not returned directly to DC supply lead 102 but, instead, are returned to lead 102 via leads 82 and 84 through switch 80. Therefore, opening of switch 80 by the dropout of the hold relay resets SCR's 110a and 110b by interrupting the cathode-anode circuits thereof to return the SCR's to their nonconductive states. The timing illustrated in FIG. 2 contemplates that the coin slides are reciprocated twice during each 360° of rotation of the shaft of changer motor 66; thus, the solenoids 68 and 70 must be de-energized before the second 180° of rotation commences to prevent the discharge of a second dime and nickel. Thus, in this particular case, operation of changer motor 66 is ineffective during the second 180° of rotation of its shaft since the payout solenoids 68 and 70 are no longer energized.

After 225° of rotation of the output shaft of changer motor 6, the motor carry-over switch 74 is actuated and operation of motor 66 continues by virtue of a circuit then established along lead 88 and switch 78 of the hold relay, the latter having been de-energized earlier as discussed above. At 290° of rotation of the changer motor shaft, the reset switch 64 opens to break the power to lead 96, but this serves no function in the instant example where 15¢ in change is paid back since the SCR's 110a and 110b where reset at 45°. At 325°, hold switch 72 recloses to re-energize the coil 76 of the hold relay, whereupon changer motor 66 momentarily stops unless start switch 90 has returned to its standby position illustrated. Before the vend cycle is completed, switches 32 and 90 are returned to normal and the changer motor 66 completes its cycle via a circuit through switch 90, switch 78, lead 88, and switch 74. Then, at a time just short of the completion of 360° of rotation of the changer motor shaft, as illustrated in FIG. 2, reset switch 64 recloses to return power to the payout module 60. Finally, at 360°, the changer motor carry-over switch 74 is returned to normal and the circuit is now in standby.

It should be noted in FIG. 2 that an additional timing plot 142 is shown for the purpose of illustrating that the changer motor 66 may be provided with a rewind cam (not shown) which is engageable with the totalizer element 52 for the purpose of returning the latter to its standby position. This is achieved during the period from 45° to 325°, at which time the lead wiper 52a is returned to its initial position engaging the "0" price contact. Since switch 32 opened at the time switch 90 was operated to start the changer motor, there is no current through the totalizer to cause arcing during the resetting thereof.

The foregoing example assumed that a 25¢ deposit was made and that the customer selected an article costing 10¢. However, if selector switch 20 is operated to obtain an article costing 25¢, then an exact price condition exists and a circuit is established through vend solenoid 14 via correct price lead 62 and reset switch 64, by-passing the payout module 60.

If, on the other hand, the customer deposits 25¢ and selects a 5¢ article by operating selector switch 16, then 20¢ in change must be paid back. The operation of the circuitry is the same as before, except that the circuit through the totalizer 52 and the payout module 60 is established via the 5¢ price terminal and the 20¢ over-price terminal. This energizes the primary winding 126 of the gating transformer associated with SCR 110 to, in turn, energize the dime payout solenoid 70. Since the cathode of SCR 110 is returned directly to the DC power lead 102, opening of the switch 80 after 45° of rotation of the shaft of changer motor 66 will not reset SCR 110. Instead, the dime solenoid 70 remains energized until the reset switch 64 is opened at 290° thereby permitting two dimes to be discharged by the dime coin slide.

From the foregoing illustrations of 15¢ and 20¢ payout it is obvious that a change payout signal delivered to the 5¢ or 10¢ over-price terminal of the payout module 60 would effect the payout of a corresponding amount of change. Regardless of which over-price terminal 58 is excited by the change payout signal, the effect of the module 60 on the operation of the circuit is negligible since large inductances are not required in the primary windings of the three gating transformers.

Since the selector switch 16, 18 or 20, the corresponding vend solenoid 10, 12 or 14, the totalizer element 52, and the appropriate gating transformer primary or primaries in the module 60 are connected in series circuit interrelationship, series sensing is effected by the instant invention when a selection is made by a customer. The determination of the over-deposit condition and the conditioning of the changer for correct change payout occur at the time that the article is selected; therefore, it is not necessary to provide a means of holding price information during the vend cycle while the amount of change to be paid back is determined, thus eliminating some complexities of prior circuits. It should be understood that the principles of series sensing may be equally well applied to an unlock solenoid, for example, such as utilized in machines where the product is withdrawn directly by the customer or through the medium of a manually operated dispensing mechanism, or to any electrically-controlled selective vending machine wherein the act of making a product selection causes actuation of a respective switch in the control circuitry of the machine.

Having thus described the invention, what is claimed as new and desired to be secured by Letters Patent is:

1. In an article vending machine:
   electrically responsive structure for permitting the dispensing of an article from said machine;
   credit registering and change determining apparatus having terminal means representing the price of said article, an over-price connection, and a totalizer element establishing electrical continuity between said terminal means and said connection in response to the deposit of money in the machine of a value greater than said price;
   electrically responsive means operable to cause payout of change from said machine;
   circuit means coupling said structure with said terminal means and coupling said connection with said electrically responsive means to interconnect said structure, said apparatus and said electrically responsive means in series with one another for determination of the over-price condition and to effect operation of the electrically responsive means at the same time that dispensing of said article is permitted; and
   an electrically responsive component permitting payout of change from said machine, and an electrically responsive, bistate switching device coupled with said component for controlling energization thereof,
   said circuit means being adapted to connect the serially interconnected structure, apparatus, and electrically responsive means across a source of electrical excitation,
   said electrically responsive means including gating means coupled with said device and responsive to flow of electric current in the circuit means for effecting a change-of-state of said device.

2. In an article vending machine:
   electrically responsive structure for permitting the dispensing of an article from said machine;
   credit registering and change determining apparatus having terminal means representing the price of said article, an over-price connection, and a totalizer element establishing electrical continuity between said terminal means and said connection in response to the deposit of money in the machine of a value greater than said price;
   electrically responsive means operable to cause payout of change from said machine;
   circuit means coupling said structure with said terminal means and coupling said connection with said electrically responsive means to interconnect said structure, said apparatus and said electrically responsive means in series with one another,
   said ciruit means being adapted to connect the serially interconnected structure, apparatus, and electrically responsive means across a source of electrical excitation; and
   customer responsive switch means interposed in series with said circuit means and operable to establish electrical continuity in said circuit means when continuity between said terminal means and said connection is established by said totalizer element, whereby to provide series sensing of the selection of said article and the sufficiency of a deposit and, therefore, permit dispensing of said article and instantaneous over-price determination and operation of said electrically responsive means if the deposit is of said value.

3. In a multiple price vending machine:
   electrically responsive structure for permitting the dispensing of articles of different prices from said machine;
   credit registering and change determining apparatus having a plurality of terminals representing respective prices, an over-price connection, and a totalizer element establishing electrical continuity between any one of said terminals and said connection in response to the deposit of money in the machine of a value equal to the price represented by the one terminal plus a fixed amount in excess of the price it represents;
   electrically responsive means operable to cause payout of change from said machine in said amount;
   circuit means coupling said structure with said terminals and coupling said connection with said electrically responsive means to interconnect said structure, said apparatus and said electrically responsive means in series with one another, said circuit means being adapted to connect the serially interconnected structure, apparatus, and electrically responsive means across a source of electrical excitation; and customer-responsive switch means interposed in series with said circuit means and operable to establish electrical continuity in said circuit means through the terminal representing the price of a desired article when continuity between the last-mentioned terminal and said connection is established by said totalizer element, whereby to provide series sensing of the selection of the desired article and the sufficiency of a deposit and, therefore, permit dispensing of the desired article and instantaneous over-price determination and operation of said electrically responsive means if the deposit equals the price of the desired article plus said fixed amount.

4. The invention of claim 3, there being a plurality of said over-price connections corresponding to a plurality of different fixed amounts of change, said totalizer element establishing electrical continuity between any one of said terminals and any one of said connections, depending upon said value of the money deposited, said electrically responsive means being operable to cause payout of change in any of said amounts, and being responsive to the establishment of electrical continuity in the circuit means along a particular connection for causing payout of change in accordance with the amount corresponding to the particular connection.

5. In a machine for vending articles of a predetermined price having credit registering apparatus provided with a plurality of over-price connections representing different excess deposit amounts and operable to deliver a change payout signal over the over-price connection corresponding to the amount of change to be paid back when an excess deposit is made, and where the machine employs a plurality of electrically responsive components, each of which controls the payout of change in the amount represented by a corresponding over-price connection and has a normal, inoperative condition and an activated condition permitting change payout, the combination with said apparatus and said components of:

a plurality of electrically responsive, bistate switching device coupled with respective components for controlling energization thereof; and a plurality of gating means, each of the latter being coupled with a corresponding device and with the corresponding over-price connection and responsive to the delivery of said signal thereover for effecting a change-of-state of the device to, in turn, cause the corresponding component to assume its activated condition, whereby to permit payout of change of the proper amount.

6. The invention of claim 5, each of said devices having a pair of switching terminals and a control input, and being characterized by a normal, high impedance state in which substantial conduction between said terminals is precluded, and changing to a low impedance state between said terminals in response to gating of said input, each gating means being connected to the input of the corresponding device and applying excitation thereto in response to the delivery of said signal over the corresponding over-price connection, whereby to cause the device to assume its low impedance state.

7. The invention of claim 6, and circuit means connected with the terminals of the devices and said components for coupling the terminals of each device and the respective component in series interrelationship across a source of electrical potential, each device remaining in the low impedance state upon said gating of the input thereof as long as substantial electric current flows in said circuit means between the terminals of the device, there being a switch interposed in series with said circuit means for interrupting the electrical continuity of the latter to return a gated device to the high impedance state.

8. The invention of claim 5, one of said over-price connections representing an excess deposit amount equal to the total of the change payout under the control of a pair of said components, there being an additional gating means coupled with the pair of devices controlling said pair of components and coupled with said one over-price connection for effecting a change-of-state of said pair of devices in response to the delivery of said signal over said one connection.

9. The invention of claim 5, there being a module having said devices and said plurality of gating means as elements thereof, said module being provided with a plurality of over-price terminals presenting electrical junctions with said over-price connections, and conductor means connecting each gating means to a corresponding over-price terminal.

10. The invention of claim 9, each of said devices having a pair of switching terminals and a control input, and being charactreized by a normal, high impedance state in which substantial conduction between said terminals is precluded, and changing to a low impedance state between said terminals in response to gating of said input, each gating means inductively coupling the input of the corresponding device with the corresponding over-price terminal.

11. The invention of claim 10, one of said over-price connections representing an excess deposit amount equal to the total of the change payout under the control of a pair of said components, said module being provided with an additional over-price terminal presenting an electrical junction with said one over-price connection, there being an additional gating means inductively coupling the inputs of the pair of devices coupled with said pair of components to said additional over-price terminal.

12. The invention of claim 10, each of said devices comprising a silicon controlled rectifier.

13. In a machine for vending articles of a predetermined price having credit registering apparatus provided with a plurality of over-price connections representing different excess deposit amounts and operable to deliver a change payout signal over the over-price connection corresponding to the amount of change to be paid back when an excess deposit is made, and where the machine employs an electrically responsive control component having a normal, inoperative condition and an activated condition permitting the payout of change, the combination with said apparatus and said component of:

means for discharging change of a predetermined monetary value at repeated intervals during operation of the change-discharging means when said component is in its activated condition;

a plurality of electrically responsive, bistate switching devices coupled with said component for independently controlling energization thereof;

a plurality of gating means each coupled with a corresponding device and a corresponding over-price connection and responsive to the delivery of said signal thereover for effecting a change-of-state of the device to, in turn, cause the component to assume its activated condition; and reset structure operably associated with said devices and responsive to said change-discharging means for returning a gated device to its normal state after the interval of operation of the change-discharging means corresponding to previous operation thereof for a period of time sufficient to pay out change of the amount corresponding to the over-price connection delivering said signal, whereby to terminate the payout of change.

14. The invention of claim 13, there being a module having said devices and plurality of gating means as elements thereof, said module being provided with a plurality of over-price terminals presenting electrical junctions with said over-price connections, and conductor means connecting each gating means to a corresponding over-price terminal.

15. The invention of claim 14, each of said devices having a pair of switching terminals and a control input, and being characterized by a normal, high impedance state in which substantial conduction between said terminals is precluded, and changing to a low impedance state between said terminals in response to gating of said input, each gating means inductively coupling the input of the corresponding device with the corresponding over-price terminal.

16. In a machine for vending articles of a predetermined price having credit registering apparatus provided with a plurality of over-price connections representing different excess deposit amounts and operable to deliver a change payout signal over the over-price connection corresponding to the amount of change to be paid back when an excess deposit is made, and where the machine employs a plurality of electrically responsive components, each of which controls the payout of change by a single coin in the amount represented by a corresponding over-price connection and has a normal, inoperative condition and an activated condition permitting change payout, the combination with said apparatus and said components of:

a plurality of electrically responsive, bistate switching devices coupled with respective components for controlling enegization thereof;

a plurality of gating means, each of the latter being coupled with a corresponding device and with the corresponding over-price connection and responsive to the delivery of said signal thereover for effecting a change-of-state of the device to, in turn, cause the corresponding component to assume its activated condition, whereby to permit payout of change of the proper amount, one of said over-price connections representing an excess deposit amount equal to twice the single coin change payout under the control of one of said components; and means for extending the activated condition of said one component to cause payout of two of said single coins under the control of said one component.

References Cited

UNITED STATES PATENTS

| 3,307,671 | 3/1967 | Shirley | 194—10 |
| 3,335,838 | 8/1967 | Schuller et al | 194—10 |

Stanley H. Tollberg, Primary Examiner